US012785096B2

(12) United States Patent
Wu

(10) Patent No.: US 12,785,096 B2
(45) Date of Patent: Nov. 3, 2026

(54) POSITIVE ELECTRODE MATERIAL, ELECTROCHEMICAL APPARATUS, AND ELECTRONIC APPARATUS

(71) Applicant: NINGDE AMPEREX TECHNOLOGY LIMITED, Ningde City (CN)

(72) Inventor: Xia Wu, Ningde City (CN)

(73) Assignee: NINGDE AMPEREX TECHNOLOGY LIMITED, Ningde City (CN)

(*) Notice: Subject to any disclaimer, the term of this patent is extended or adjusted under 35 U.S.C. 154(b) by 685 days.

(21) Appl. No.: 18/207,899

(22) Filed: Jun. 9, 2023

(65) Prior Publication Data

US 2023/0352677 A1 Nov. 2, 2023

Related U.S. Application Data

(63) Continuation of application No. PCT/CN2021/104024, filed on Jul. 1, 2021.

(30) Foreign Application Priority Data

Dec. 11, 2020 (CN) ......................... 202011460086.8

(51) Int. Cl.

| | |
|---|---|
| ***H01M 4/525*** | (2010.01) |
| ***C01G 51/42*** | (2025.01) |
| ***H01M 4/02*** | (2006.01) |
| ***H01M 4/131*** | (2010.01) |
| ***H01M 4/505*** | (2010.01) |
| ***H01M 10/0567*** | (2010.01) |
| ***H01M 10/42*** | (2006.01) |

(52) U.S. Cl.

CPC ............ *H01M 4/525* (2013.01); *C01G 51/42* (2013.01); *H01M 4/131* (2013.01); *H01M 4/505* (2013.01); *H01M 10/0567* (2013.01); *H01M 10/4235* (2013.01); *C01P 2002/52* (2013.01); *C01P 2002/76* (2013.01); *C01P 2004/53* (2013.01); *C01P 2004/61* (2013.01); *C01P 2006/12* (2013.01); *C01P 2006/40* (2013.01); *H01M 2004/021* (2013.01); *H01M 2004/028* (2013.01)

(58) Field of Classification Search

CPC ...... H01M 4/525; H01M 4/131; H01M 4/364; H01M 4/485; H01M 4/505; H01M 10/0567; H01M 10/4235; H01M 10/0569; H01M 10/0525; H01M 2004/021; H01M 2004/028; H01M 2300/0028; C01G 51/42; C01G 53/50; C01P 2002/52; C01P 2004/53; C01P 2004/61; C01P 2006/12; C01P 2006/40; C01P 2002/76; Y02E 60/10

See application file for complete search history.

(56) References Cited

U.S. PATENT DOCUMENTS

| | | | |
|---|---|---|---|
| 2009/0008602 A1 | 1/2009 | Yoshida et al. | |
| 2011/0059356 A1 | 3/2011 | Ogasawara et al. | |
| 2014/0079990 A1 | 3/2014 | Yanagida et al. | |
| 2015/0132666 A1 | 5/2015 | Ogata et al. | |
| 2016/0351901 A1 | 12/2016 | Saito | |
| 2020/0335783 A1 | 10/2020 | Lee et al. | |
| 2022/0376244 A1* | 11/2022 | Kuroda | C01G 53/50 |

FOREIGN PATENT DOCUMENTS

| | | |
|---|---|---|
| CN | 102013514 A | 4/2011 |
| CN | 102779976 A | 11/2012 |
| CN | 103582971 A | 2/2014 |
| CN | 105940534 A | 9/2016 |
| CN | 109860540 A | 6/2019 |
| CN | 111316480 A | 6/2020 |
| CN | 112670508 A | 4/2021 |
| EP | 3696894 A1 | 8/2020 |
| JP | 2004-119218 A | 4/2004 |
| JP | 2009-238587 A | 10/2009 |
| JP | 2011-077016 A | 4/2011 |
| JP | 2018-18789 A | 2/2018 |
| JP | 2018-041657 A | 3/2018 |
| WO | 2012/165207 A1 | 12/2012 |
| WO | 2015/115025 A1 | 8/2015 |
| WO | 2018/061298 A1 | 4/2018 |
| WO | 2019/103463 A1 | 5/2019 |

OTHER PUBLICATIONS

International Search Report dated Sep. 28, 2021, issued in counterpart International application No. PCT/CN2021/104024, with English translation. (6 pages).
Office Action dated Apr. 22, 2023, issued in counterpart CN application No. 202011460086.8. (6 pages).
Office Action dated Apr. 4, 2023, issued in counterpart JP application No. 2022-518858, with English translation. (10 pages).
Office Action dated Feb. 13, 2024, issued in counterpart JP Application No. 2022-518858, with English translation (6 pages).
Extended (Supplementary) European Search Report dated May 6, 2024, issued in counterpart EP Application No. 21902005. (2 pages).
Office Action dated Sep. 19, 2023, issued in counterpart JP Application No. 2022-518858, with English Translation. (8 pages).
Notice of Allowance dated Nov. 7, 2023, issued in counterpart CN Application No. 202011460086.8. (4 pages).

* cited by examiner

*Primary Examiner* — Aiqun Li
(74) *Attorney, Agent, or Firm* — WHDA, LLP

(57) ABSTRACT

A positive electrode material having particles with $P6_3mc$ crystal phase structure; and a particle size distribution frequency graph of the positive electrode material comprise comprises a first peak and a second peak. The positive electrode material has a stable crystal structure, and the electrochemical apparatus using the positive electrode material can maintain high capacity and good cycling performance at a high voltage.

8 Claims, No Drawings

POSITIVE ELECTRODE MATERIAL, ELECTROCHEMICAL APPARATUS, AND ELECTRONIC APPARATUS

CROSS REFERENCE TO RELATED APPLICATIONS

This application is a continuation application of International Application No. PCT/CN2021/104024 filed on Jul. 1, 2021, which claims the benefit of priority of Chinese patent application 202011460086.8, filed on Dec. 11, 2020, the contents of which are incorporated herein by reference in its entirety.

TECHNICAL FIELD

This application relates to the field of electrochemical technologies, and in particular, to a positive electrode material, an electrochemical apparatus, and an electronic apparatus.

BACKGROUND

With development and progress of electrochemical apparatuses (for example, lithium-ion batteries), higher requirements are put forward for capacities of the electrochemical apparatuses. To increase the capacities of the electrochemical apparatuses, an important way is to increase voltages of the electrochemical apparatuses. However, positive electrode materials of the electrochemical apparatuses have an unstable crystal structure at a high voltage, resulting in rapid capacity decay and great cycling performance degradation.

At present, a positive electrode material lithium cobaltate widely used in electrochemical apparatuses (for example, lithium-ion batteries) is an R-3m crystal phase structure, with a theoretical capacity of 273.8 mAh/g, providing good cycling performance and safety performance, and possessing an important position in the positive electrode material market. To obtain higher specific energy, lithium cobaltate materials are developing towards high voltage. At present, capacities of the lithium cobaltate materials only reach 190 mA/g at a charging voltage of 4.5 V. Attempts have been made to increase the capacities of the lithium cobaltate materials by deintercalating more lithium ions from crystal structures of the lithium cobaltate materials. However, as the voltage further increases, deintercalation of lithium ions from the crystal structures of lithium cobaltate will cause a series of irreversible phase transitions, greatly reducing cycling performance and storage performance of the lithium cobaltate materials. In addition, side reactions at the interface increase at a high voltage, dissolution of cobalt metal becomes serious, and decomposition of an electrolyte increases, resulting in extremely serious capacity decay of the lithium cobaltate materials.

SUMMARY

This application provides a positive electrode material, an electrochemical apparatus, and an electronic apparatus. The positive electrode material in this application has a stable crystal structure, and the electrochemical apparatus using the positive electrode material can maintain high capacity and good cycling performance at a high voltage.

This application proposes a positive electrode material in some embodiments. The positive electrode material comprises particles with $P6_3mc$ crystal phase structure; and a particle size distribution frequency graph of the positive electrode material comprises a first peak and a second peak. This application proposes a positive electrode material including particles of different average particle sizes. On one hand, a $P6_3mc$ phase compound has a special oxygen structure, is stable at a high voltage of 4.6 V, friendly to electrolytes, and has excellent cycling performance. On the other hand, the positive electrode material whose particles have different average particle sizes is devised in such a way that effects of the particles of different average particle sizes can be fully utilized, processing performance of the material can be improved, the problems of high sedimentation for a formulation and low compacted density can be resolved, and rate performance can be improved. Moreover, the $P6_3mc$ crystal phase structure has a unique lithium-deficient structure. In a process of lithium intercalation and deintercalation, due to the presence of lithium vacancies in the crystal structure, the crystal structure has a capability to accommodate additional lithium ions, so that capacity decay can be prevented. When the particles of different average particle sizes are mixed, kinetic performance of the positive electrode material can be improved. Therefore, the $P6_3mc$ crystal phase structure has a stronger lithium-intercalation capability, providing a better capacity and better cycling performance.

In some embodiments, the particle size of particles represented by the first peak are smaller than the particle size of particles represented by the second peak, a peak area of the first peak is S1, a peak area of the second peak is S2, and $0<S1/S2<1$. In some embodiments, S1 and S2 respectively represent percentages of particles with two different average particle sizes. $0<S1/S2<1$ indicates that a percentage of particles having a smaller average particle size is lower than 50%. If the percentage of particles having a smaller average particle size is too high, the cycling performance may decrease. In some embodiments, if there are no particles having a smaller average particle size, it is inconducive to increasing the compacted density, and it is detrimental to improving the kinetic performance of the positive electrode material.

In some embodiments, first particles and second particles have different chemical compositions, where the first particles comprise $Li_xNa_zCo_{1-y1}M^1_{y1}O_2$, where $0.6<x<0.95$, $0\le y1<0.15$, $0\le z<0.05$, and $M^1$ comprises at least one of Al, Mg, Ti, Zr, La, Ca, Ge, Nb, Sn, or Y; the second particles comprise $Li_xNa_zCo_{1-y2}M^2_{y2}O_2$, where $0.6<x<0.95$, $0\le y2<0.15$, $0\le z<0.05$, and $M^2$ comprises at least one of Ni, Mn, Zn, or Fe. Particles having different average particle sizes have different performance. Particles having a smaller average particle size have relatively poor cycling performance, and particles having a larger average particle size have relatively poor rate performance. Therefore, in some embodiments of this application, the first particles and the second particles have different chemical compositions. For performance shortcomings of the particles of different average particle sizes, corresponding chemical compositions are selected to make up for the performance shortcomings.

In some embodiments, an average particle size of the first particles ranges from 3 μm to 12 μm, and an average particle size of the second particles ranges from 15 μm to 30 μm. In some embodiments, if the average particle sizes of the first particles and the second particles are too small, electrolyte consumption increases, and it is inconducive to the cycling performance of the positive electrode material. In some other embodiments, if the average particle sizes of the first particles and the second particles are too large, the rate performance may decrease.

In some embodiments, the particles of the positive electrode material have pores and cracks inside. The particles having pores and cracks can fully contact the electrolyte, and when the positive electrode material swells during charging and discharging, the pores and cracks can reduce internal stress of the positive electrode material, thereby helping to improve the stability of the crystal structure. In some embodiments, a specific surface area of the positive electrode material ranges from 0.1 $m^2/g$ to 2 $m^2/g$. Too small specific surface area is inconducive to the rate performance, and too large specific surface area may lead to a decrease in cycling performance.

This application proposes a positive electrode material in some embodiments, where the positive electrode material comprises particles with $P6_3mc$ crystal phase structure; a particle size distribution frequency graph of the positive electrode material comprises a first peak and a second peak; the positive electrode material comprises $Li_xNa_zCo_{1-y}M_yO_2$, where $0.6<x<0.95$, $0 \le y<0.15$, $0 \le z<0.05$, and M comprises at least one of Al, Mg, Ti, Mn, Fe, Ni, Zn, Cu, Nb, Cr, Y, or Zr; and an average particle size of the particles with the $P6_3mc$ crystal phase structure ranges from 3 μm to 30 μm. In some embodiments, for the positive electrode material, a doped or undoped lithium cobaltate material can be used. The doping elements in lithium cobaltate can enhance structural stability, but when the percentage of the doping elements is too high, it may cause large capacity loss. Within the scope defined in this application, the structural stability can be enhanced while the capacity is ensured.

In some embodiments, the particles of the positive electrode material have pores and cracks inside. The particles having pores and cracks can fully contact the electrolyte, and when the positive electrode material swells during charging and discharging, the pores and cracks can reduce internal stress of the positive electrode material, thereby helping to improve the stability of the crystal structure. In some embodiments, a specific surface area of the positive electrode material ranges from 0.1 $m^2/g$ to 2 $m^2/g$. Too small specific surface area is inconducive to the rate performance, and too large specific surface area may lead to a decrease in cycling performance.

This application proposes an electrochemical apparatus in some embodiments, including: a positive electrode, a negative electrode, an electrolyte, and a separator disposed between the positive electrode and the negative electrode, where the positive electrode comprises a current collector and a positive electrode active substance layer disposed on the current collector, and the positive electrode active substance layer comprises the positive electrode material according to any one of the foregoing embodiments.

In some embodiments, a compacted density of the positive electrode active substance layer of the electrochemical apparatus ranges from 3 $g/cm^3$ to 4.35 $g/cm^3$. In some embodiments, the positive electrode material has particles of two different average particle sizes, which is beneficial to increase the compacted density of the positive electrode active material layer. However, excessive compacted density may cause particle breakage.

In some embodiments, the electrolyte comprises a compound having two or three cyano groups, where the compound having two or three cyano groups comprises at least one of a dinitrile compound, a trinitrile compound, an ether dinitrile compound, or an ether trinitrile compound. In some embodiments, because the carbon-nitrogen triple bond in the chlorine group has high bond energy, the electrolyte is not easy to be oxidized and has high stability. In addition, the chlorine group has a strong coordination capability and can be coordinated with high-valence metal ions in the positive electrode material to reduce the electrolyte decomposition. Compared with the single chlorine compound, the compound having 2 or 3 chlorine groups can better reduce reaction between the positive electrode and the electrolyte, and inhibit gas generation.

In some embodiments, the compound having two or three cyano groups comprises at least one of glutaronitrile, succinonitrile, adiponitrile, 1,3,6-hexanetricarbonitrile, 1,3,5-pentanetricarbonitrile, 1,2,3-propanetricarbonitrile, or 1,2,4-tris(2-cyanoethoxy)butane, where a percentage of the compound having two or three cyano groups ranges from 0.01 wt % to 15 wt % based on a weight of the electrolyte.

This application proposes an electronic apparatus in some embodiments, including the electrochemical apparatus according to any one of the foregoing embodiments.

In some embodiments, the electrolyte comprises an organic solvent, and the organic solvent comprises at least one of ethylene carbonate, diethyl carbonate, propylene carbonate, propyl propionate, or vinylene carbonate. The synergistic effect of the organic solvent and the positive electrode material herein stabilizes the crystal structure of the positive electrode material, thereby improving cycling performance.

The positive electrode material provided in the embodiments of this application comprises particles with $P6_3mc$ crystal phase structure. The $P6_3mc$ crystal phase structure has a unique HCP (hexagonal closest packing, hexagonal closest packing) oxygen structure; where during high-voltage (for example, 4.6 V and above) cycling, the oxygen structure is stable and friendly to an electrolyte, and provides excellent cycling performance. In this application, the particle size distribution frequency graph of the positive electrode material comprises the first peak and the second peak, indicating that the positive electrode material comprises particles with two different sizes, which can improve processing performance of the material and resolve the problems of high sedimentation for a formulation and low compacted density. In addition, the $P6_3mc$ crystal phase structure itself is a lithium-deficient material, needs to deintercalate lithium ions in a charging process to open a channel, and in a discharge process, in addition to accommodating the lithium ions deintercalated, has an electrochemical lithium intercalation capability, absorbing additional lithium ions. The positive electrode material has both the large and small particles, improving kinetic performance of the positive electrode material, so that the positive electrode material has a stronger lithium intercalation capability, and provides a higher capacity and better cycling performance.

DETAILED DESCRIPTION

The following describes the embodiments of this application in more detail. This application may be implemented in various forms. It should be noted that this application is not limited to the embodiments set forth herein. On the contrary, these embodiments are provided for a more thorough and complete understanding of this application.

In the prior art, a crystal structure of a positive electrode material lithium cobaltate with an R-3m phase undergoes irreversible phase transitions (from 03 to H1-3, and from H1-3 to 01) at a high voltage of 4.6 V and above, which greatly reduces cycling performance and safety performance of the material. In the related art, metal cation bulk doping is generally used to improve structural stability of the positive electrode material lithium cobaltate with the R-3m phase. Most element doping is to delay irreversible phase transitions to improve the structural stability of the material. However, effects of this method on improving the structural stability are not obvious at a voltage higher than 4.6 V. Theoretical capacity losses increase with an increasing amount of doping. Therefore, in the related art, it is impossible to maintain the stability of the crystal structure under high voltage of 4.6 V and above while maintaining capacity and cycling performance.

To at least partially resolve the foregoing problems, this application proposes a positive electrode material in some embodiments. The positive electrode material comprises particles with $P6_3mc$ crystal phase structure; and a particle size distribution frequency graph of the positive electrode material comprises first peak and a second peak. This indicates that the positive electrode material comprises particles with $P6_3mc$ crystal phase structure and two different average particle sizes.

This application proposes a positive electrode material including particles of different average particle sizes. On one hand, a $P6_3mc$ phase compound has a special HCP oxygen structure, is stable at a high voltage of 4.6 V, friendly to electrolytes, and has excellent cycling performance. On the other hand, by devising the positive electrode material whose particles have different average particle sizes, effects of the particles of different average particle sizes can be fully utilized, processing performance of the material can be improved, the problems of high sedimentation for a formulation and low compacted density can be resolved, and rate performance can be improved. More importantly, the $P6_3mc$ crystal phase structure has a unique lithium-deficient structure. In a process of lithium intercalation and deintercalation, due to the presence of lithium vacancies in the crystal structure, the crystal structure has a capability to accommodate additional lithium ions, so that capacity decay can be prevented. When the particles of different average particle sizes are mixed, kinetic performance of the positive electrode material can be improved. Therefore, the $P6_3mc$ crystal phase structure has a stronger lithium-intercalation capability, providing a better capacity and better cycling performance.

In some embodiments of this application, the particle size of particles represented by the first peak are smaller than the particle size of particles represented by the second peak, a peak area of the first peak is S1, a peak area of the second peak is S2, and $0<S1/S2<1$. In some embodiments, S1 and S2 respectively represent percentages of particles with two different average particle sizes. $0<S1/S2<1$ indicates that a percentage of particles having a smaller average particle size is lower than 50%. If the percentage of particles having a smaller average particle size is too high, the cycling performance may decrease. In some embodiments, if there are no particles having a smaller average particle size, it is inconducive to increasing the compacted density, and it is detrimental to improving the kinetic performance of the positive electrode material.

In some embodiments of this application, the positive electrode material comprises first particles and second particles, where the first particles and the second particles have different chemical compositions. In some embodiments of this application, the first particles comprise $Li_xNa_zCo_{1-y1}M^1_{y1}O_2$, where $0.6<x<0.95$, $0\leq y1<0.15$, $0\leq z<0.05$, and $M^1$ comprises at least one of Al, Mg, Ti, Zr, La, Ca, Ge, Nb, Sn, or Y; and the second particles comprise $Li_xNa_zCo_{1-y2}M^2_{y2}O_2$, where $0.6<x<0.95$, $0\leq y2<0.15$, $0\leq z<0.05$, and $M^2$ comprises at least one of Ni, Mn, Zn, or Fe. In some embodiments, particles having different average particle sizes have different performance. Particles having a smaller average particle size have relatively poor cycling performance, and particles having a larger average particle size have relatively poor rate performance. Therefore, in some embodiments of this application, the first particles and the second particles have different chemical compositions. For performance shortcomings of the particles of different average particle sizes, corresponding chemical compositions are selected to make up for the performance shortcomings. For example, the first particles having a smaller average particle size are doped with an element that improves the cycling performance, and the second particles having a larger average particle size are doped with an element that improves the rate performance, so that the positive electrode material exhibits better rate performance and cycling performance on the whole. An average particle size of the first particles ranges from 3 μm to 12 μm, and an average particle size of the second particles ranges from 15 μm to 30 μm. In some embodiments, if the average particle sizes of the first particles and the second particles are too small, electrolyte consumption increases, and it is inconducive to the cycling performance of the positive electrode material. In some other embodiments, if the average particle sizes of the first particles and the second particles are too large, the rate performance may decrease. In some embodiments, the first particles are the particles represented by the first peak, the second particles are the particles represented by the second peak, and the first particles and the second particles each have the $P6_3mc$ crystal phase structure.

In some embodiments of this application, the particles of the positive electrode material have pores and cracks inside. In some embodiments, the particles having pores and cracks can fully contact the electrolyte, and when the positive electrode material swells during charging and discharging, the pores and cracks can reduce internal stress of the positive electrode material, thereby helping to improve the stability of the crystal structure. In some embodiments, the number of pores and cracks of one particle is less than or equal to 50. Too many pores and cracks may result in insufficient mechanical strength of the positive electrode material, which is prone to crystal collapse.

This application proposes a positive electrode material in some embodiments, where the positive electrode material comprises particles with $P6_3mc$ crystal phase structure; a particle size distribution frequency graph of the positive electrode material comprises a first peak and a second peak; the positive electrode material comprises $Li_xNa_zCo_{1-y}M_yO_2$, where $0.6<x<0.95$, $0\leq y<0.15$, $0\leq z<0.05$, and M comprises at least one of Al, Mg, Ti, Mn, Fe, Ni, Zn, Cu, Nb, Cr, Y, or Zr; and an average particle size of the particles with the $P6_3mc$ crystal phase structure ranges from 3 μm to 30 μm.

In some embodiments, the positive electrode material may use a doped or undoped lithium cobaltate material. By doping in lithium cobaltate, the structural stability can be improved. However, under the condition that a percentage of a doping element is too high, capacity losses may be too large. Within the scope defined in this application, the structural stability can be improved and the capacity is guaranteed.

In some embodiments, the particle size of the particles affect the structural stability and rate performance of the positive electrode material. In some embodiments, the first particles having a smaller average particle size have poorer structural stability than the second particles, and the second particles having a larger average particle size have poorer rate performance than the first particles. Therefore, the first particles can be doped with $M^1$ that is beneficial to improve structural stability of the first particles, and the second particles can be doped with $M^2$ that is beneficial to improve rate performance of the second particles.

In some embodiments of this application, the particles of the positive electrode material have pores and cracks inside. In some embodiments, the particles having pores and cracks can fully contact the electrolyte, and when the positive electrode material swells during charging and discharging, the pores and cracks can reduce internal stress of the positive electrode material, thereby helping to improve the stability of the crystal structure. In some embodiments, the number of pores and cracks of one particle is less than or equal to 50. Too many pores and cracks may result in insufficient mechanical strength of the positive electrode material, which is prone to crystal collapse.

In some embodiments of this application, a specific surface area of the positive electrode material ranges from 0.1 $m^2/g$ to 2 $m^2/g$. In some embodiments, under the condition that the specific surface area is greater than 2 $m^2/g$, the electrolyte consumption is accelerated and the stability of the crystal structure is reduced, possibly causing the cycling performance to degrade, which is inconducive to cycling performance, while the specific surface area less than 0.1 $m^2/g$ may lead to poor rate performance.

This application further proposes an electrochemical apparatus in some embodiments, including: a positive electrode, a negative electrode, an electrolyte, and a separator disposed between the positive electrode and the negative electrode, where the positive electrode comprises a current collector and a positive electrode active substance layer disposed on the current collector, and the positive electrode active substance layer comprises the positive electrode material according to any one of the foregoing embodiments.

In some embodiments of this application, a compacted density of the positive electrode active substance layer of the electrochemical apparatus ranges from 3 $g/cm^3$ to 4.35 $g/cm^3$. In some embodiments, the positive electrode material has particles with two different average particle sizes, which is beneficial to increase a compacted density of the positive electrode active substance layer. In some embodiments, the compacted density of the positive electrode active substance layer is 3.80 $g/cm^3$ or more under the condition that the positive electrode active substance layer is compressed at a pressure of 150 MPa; the compacted density of the positive electrode active substance layer is 4 $g/cm^3$ or more under the condition that the positive electrode active substance layer is compressed at a pressure of 250 MPa; and the compacted density of the positive electrode active substance layer is 4.2 $g/cm^3$ or more under the condition that the positive electrode active substance layer is compressed at a pressure of 500 MPa. Under the condition that a discharge capacity of the electrochemical apparatus is not less than 200 mAh/g, the electrochemical apparatus is charged and discharged for 20 cycles at a rate of 1 C, and a growth rate of a direct current resistance of the electrochemical apparatus is less than or equal to 2%. In some embodiments, the growth rate of the direct current resistance of the electrochemical apparatus after cycling is less than or equal to 2%, which can indicate that the positive electrode material of the electrochemical apparatus in this application has good structural stability; and no significant structural changes occur during the cycling, causing no significant increase in the direct current resistance.

In some embodiments of this application, the electrolyte comprises a compound having two or three cyano groups, where the compound having two or three cyano groups comprise at least one of a dinitrile compound, a trinitrile compound, an ether dinitrile compound, or an ether trinitrile compound. In some embodiments, because the carbon-nitrogen triple bond in the cyano group has high bond energy, is not easy to be oxidized and has high stability. In addition, the cyano group has a strong coordination capability and can be coordinated with high-valence metal ions in the positive electrode material to reduce the electrolyte decomposition. Compared with the single cyanide compound, the compound having 2 or 3 cyano groups can better reduce reaction between the positive electrode and the electrolyte, and inhibit gas generation.

In some embodiments of this application, the compound having two or three cyano groups comprises at least one of glutaronitrile, succinonitrile, adiponitrile, 1,3,6-hexanetricarbonitrile, 1,3,5-pentanetricarbonitrile, 1,2,3-propanetricarbonitrile, or 1,2,4-tris(2-cyanoethoxy)butane, where a percentage of the compound having two or three cyano groups ranges from 0.01 wt % to 15 wt % based on a weight of the electrolyte.

In some embodiments, the current collector of the positive electrode may use Al foil, or certainly may use other positive electrode current collectors commonly used in the art. In some embodiments, a thickness of the positive electrode current collector may range from 1 μm to 200 μm. In some embodiments, the positive electrode active substance layer may cover only a partial zone of the positive electrode current collector. In some embodiments, a thickness of the positive electrode active substance layer may range from 10 μm to 500 μm. It should be understood that these are merely examples, and other suitable thicknesses may be used.

In some embodiments, the separator comprises at least one of polyethylene, polypropylene, polyvinylidene fluoride, polyethylene terephthalate, polyimide, or aramid. For example, polyethylene comprises at least one of high-density polyethylene, low-density polyethylene, or ultra-high-molecular-weight polyethylene. Particularly, polyethylene and polypropylene have a good effect on preventing short-circuit, and can enhance stability of a battery through the shutdown effect. In some embodiments, a thickness of the separator ranges from approximately 5 μm to 500 μm.

In some embodiments, a surface of the separator may further comprises a porous layer. The porous layer is disposed on at least one surface of the separator and comprises inorganic particles and a binder, where the inorganic particles are selected from at least one of aluminum oxide ($Al_2O_3$), silicon dioxide ($SiO_2$), magnesium oxide (MgO), titanium oxide ($TiO_2$), hafnium dioxide ($HfO_2$), stannic oxide ($SnO_2$), cerium dioxide ($CeO_2$), nickel oxide (NiO), zinc oxide (ZnO), calcium oxide (CaO), zirconium dioxide ($ZrO_2$), yttrium oxide ($Y_2O_3$), silicon carbide (SiC), boehmite, aluminum hydroxide, magnesium hydroxide, calcium hydroxide, or barium sulfate. In some embodiments, a pore diameter of the separator ranges from approximately 0.01 m to 1 μm. The binder of the porous layer is selected from at least one of polyvinylidene fluoride, a vinylidene fluoride-hexafluoropropylene copolymer, polyamide, polyacrylonitrile, polyacrylate, polyacrylic acid, polyacrylate, sodium carboxymethylcellulose, polyvinylpyrrolidone, polyvinyl ether, polymethyl methacrylate, polytetrafluoroethylene, or polyhexafluoropropylene. The porous layer on the surface of the separator may improve heat resistance, oxidation resistance, and electrolyte salt infiltration performance of the separator, and enhance cohesiveness between the separator and the electrode plate.

In some embodiments of this application, the electrochemical apparatus is a winding or stacking electrochemical apparatus.

In some embodiments, the electrochemical apparatus comprises a lithium-ion battery. However, this application is not limited thereto. In some embodiments, the electrochemical apparatus may further comprise an electrolyte salt. The electrolyte salt may be one or more of a gel electrolyte salt, a solid electrolyte salt, and a liquid electrolyte, where the liquid electrolyte comprises a lithium salt and a non-aqueous solvent. The lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoroborate. For example, $LiPF_6$ is selected as the lithium salt because it can provide a high ionic conductivity and improve cycling performance.

The non-aqueous solvent may be a carbonate compound, a carboxylate compound, an ether compound, another organic solvent, or a combination thereof.

The carbonate compound may be a linear carbonate compound, a cyclic carbonate compound, a fluorocarbonate compound, or a combination thereof.

An example of the linear carbonate compound is diethyl carbonate (DEC), dimethyl carbonate (DMC), dipropyl carbonate (DPC), methyl propyl carbonate (MPC), ethylene propyl carbonate (EPC), ethyl methyl carbonate (MEC), or a combination thereof. An example of the cyclic carbonate compound is ethylene carbonate (EC), propylene carbonate (PC), butylene carbonate (BC), vinyl ethylene carbonate (VEC), or a combination thereof. An example of the fluorocarbonate compound is fluoroethylene carbonate (FEC), 1,2-difluoroethylene carbonate, 1,1-difluoroethylene carbonate, 1,1,2-tricarbonate Fluoroethylene, 1,1,2,2-tetrafluoroethylene carbonate, 1-fluoro-2-methylethylene carbonate, 1-fluoro-1-methylethylene carbonate, carbonic acid 1,2-Difluoro-1-methylethylene, 1,1,2-trifluoro-2-methylethylene carbonate, trifluoromethylethylene carbonate, or a combination thereof.

An example of the carboxylate compound is methyl acetate, ethyl acetate, n-propyl acetate, tert-butyl acetate, methyl propionate, ethyl propionate, propyl propionate, γ-butyrolactone ester, caprolactone, valerolactone, mevalonolactone, caprolactone, methyl formate, or a combination thereof.

An example of the ether compound is dibutyl ether, tetraglyme, diglyme, 1,2-dimethoxyethane, 1,2-diethoxyethane, ethoxymethoxyethane, 2-methyltetrahydrofuran, tetrahydrofuran, and a combination thereof.

An example of the another organic solvent is dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or a combination thereof.

An embodiment of this application further provides an electronic apparatus, including the foregoing electrochemical apparatus. The electronic apparatus according to this embodiment of this application is not particularly limited, and may be any known electronic apparatus used in the prior art. In some embodiments, the electronic apparatus may comprise, but is not limited to: notebook computers, pen-input computers, mobile computers, e-book players, portable phones, portable fax machines, portable copiers, portable printers, head-mounted stereo headsets, video recorders, liquid crystal display televisions, portable cleaners, portable CD players, mini discs, transceivers, electronic notebooks, calculators, memory cards, portable recorders, radios, backup power supplies, motors, automobiles, motorcycles, assisted bicycles, bicycles, lighting apparatuses, toys, game machines, clocks, electric tools, flashlights, cameras, large household storage batteries, and lithium-ion capacitors.

This application further proposes a preparation method of a positive electrode material in some embodiments, which can be used for preparing the positive electrode material in the foregoing embodiments, and the preparation method comprises the following steps.

(1) Prepare $Li_xNa_zCo_{1-y}M_yO_2$, where $0.6<x<0.95$, $0\leq y<0.15$, $0\leq z<0.05$, and M is selected from at least one of groups combining Al, Mg, Ti, Mn, Fe, Ni, Zn, Cu, Nb, Cr, Y, or Zr.

(2) Prepare element $M^1$-doped $(Co_{1-y1}M^1_{y1})_3O_4$ and element $M^2$-doped $(Co_{1-y2}M^2_{y2})_3O_4$ precursors having different average particle sizes by liquid-phase precipitation and sintering: A soluble cobalt salt (for example, cobalt chloride, cobalt acetate, cobalt sulfate, or cobalt nitrate) and a salt M (for example, sulfate) are added into a solvent (for example, deionized water) according to molar ratios (1-y1):y1 and (1-y2):y2 of Co to M; a precipitating agent (for example, sodium carbonate or sodium hydroxide) and a complexing agent (for example, ammonia) are added at a concentration of 0.1 mol/L to 3 mol/L, where a molar ratio of the complexing agent to the precipitating agent ranges from 0.1 to 1, and a pH value is adjusted (for example, the pH value is adjusted from 5 to 9) to make it precipitate; and then the precipitate is sintered in air at 400° C. to 800° C. for 5 h to 20 h, and the sintered product is ground to obtain the element $M^1$-doped $(Co_{1-y1}M^1_{y1})_3O$ and the element $M^2$-doped $(Co_{1-y2}M^2_{y2})_3O_4$ precursors having different average particle sizes. $M^1$ comprises at least one of Al, Mg, Ti, Zr, La, Ca, Ge, Nb, Sn, or Y; and $M^2$ comprises at least one of Ni, Mn, Zn, or Fe.

(3) Synthesize $Na_mCo_{1-y}M_yO_2$ with element $M^1$-doped $(Co_{1-y1}M^1_{y1})_3O_4$ and element $M^2$-doped $(Co_{1-y2}M^2_{y2})_3O_4$ precursors by using solid-phase sintering. The obtained powder and $Na_2CO_3$ powder are mixed according to the molar ratio of Na to Co from 0.7:1 to the maximum 0.74:1; and the mixed powder is sintered in an oxygen atmosphere at 700° C. to 1000° C. for 36 h to 56 h, to obtain $Na_mCo_{1-y1}M^1_{y1}O_2$ and $Na_mCo_{1-y2}M^1_{y2}O_2$ with $P6_3mc$ structure, where $0.6<m<1$.

(4) Synthesize a positive electrode material $Li_xNa_zCo_{1-y}M_yO_2$ with $P6_3mc$ structure by using ion exchange: $Na_mCo_{1-y1}M^1_{y1}O_2$, $Na_mCo_{1-y2}M^1_{y2}O_2$, and a lithium-containing molten salt (for example, lithium nitrate, lithium chloride, or lithium hydroxide) are mixed well according to a molar ratio of Na to Li from 0.01 to 0.2; and the resulting mixture is placed at 200° C. to 400° C. in an air atmosphere for 2 h to 8 h for reaction. The reactants are washed with deionized water for many times. After the molten salt is cleaned, the powder is dried to obtain $Li_xNa_zCo_{1-y1}M^1_{y1}O_2$ with $P6_3mc$ structure, where $0.6<x<0.95$, $0\leq y1<0.15$, $0<z<0.05$; and the second particle comprises: $Li_xNa_zCo_{1-y2}M^2_{y2}O_2$, where $0.6<x<0.95$, $0\leq y2<0.15$, and $0\leq z<0.05$.

(5) $Li_xNa_zCo_{1-y1}M^1_{y1}O_2$ and $Li_xNa_zCo_{1-y2}M^2_{y2}O_2$ are mixed in a specified proportion, where an amount of $Li_xNa_zCo_{1-y2}M^2_{y2}O_2$ is less than an amount of $Li_xNa_zCo_{1-y1}M^1_{y1}O_2$.

Some specific Examples and Comparative Examples are listed below to better illustrate this application. Lithium-ion batteries are used for illustration.

Preparation of a positive electrode plate: A positive electrode material, a conductive agent-conductive carbon black, and a binder polyvinylidene fluoride were dissolved in an N-methylpyrrolidone (NMP) solution at a weight ratio of 97:1.4:1.6, to form a positive electrode slurry. An aluminum foil was used as a positive electrode current collector, the positive electrode current collector was coated with the positive electrode slurry with a weight of 17.2 mg/cm$^2$, followed by drying, cold pressing, and cutting, to obtain the positive electrode plate.

Preparation of the negative electrode plate: A negative electrode material was artificial graphite. The negative electrode material, acrylic resin, conductive carbon black, and sodium carboxymethyl cellulose were dissolved in deionized water at a weight ratio of 94.8:4.0:0.2:1.0 to form a slurry for negative electrode active substance layer, where a weight percentage of silicon was 10%. A copper foil with a thickness of 10 μm was used as a negative electrode current collector, and the negative electrode current collector was coated with the negative electrode slurry with a weight of 6.27 mg/cm$^2$, followed by drying, until a water content of the negative electrode plate was less than or equal to 300 ppm, to obtain a negative electrode active substance layer. After cutting, the negative electrode plate was obtained.

Preparation of a separator: Polyethylene (PE) with a thickness of 8 μm was used as a base material of the separator, two sides of the base material of the separator were coated with aluminum oxide ceramic layers 2 μm in thickness, and finally, the two sides coated with the ceramic layers were respectively coated with 2.5 mg of binder polyvinylidene fluoride (PVDF), followed by drying.

Preparation of an electrolyte: In an environment with a water content less than 10 ppm, lithium hexafluorophosphate and a non-aqueous organic solvent (a weight ratio of ethylene carbonate (EC) to diethyl carbonate (DEC) to propylene carbonate (PC) to propyl propionate (PP) to vinylene carbonate (VC) was equal to 20:30:20:28:2) were mixed at a weight ratio of 8:92 to prepare the electrolyte.

Preparation of a lithium-ion battery: The positive electrode plate, the separator, and the negative electrode plate were stacked in sequence, so that the separator was disposed between the positive electrode plate and the negative electrode plate for separation, and winding was performed to obtain an electrode assembly. The electrode assembly was arranged in an outer packaging aluminum-plastic film, and was dehydrated at a temperature of 80° C. After that, the above-mentioned electrolyte was injected and packaged, followed by processes such as formation, degassing, and trimming, so that the lithium-ion battery was obtained.

The preparation steps of the lithium-ion battery in Examples and Comparative Examples are the same. The difference between the Examples and Comparative Examples lies only in the positive electrode materials used. The specific positive electrode materials used are shown in Tables 1 to 8 below.

The following describes methods for testing various parameters of this application.

Particle Volume Distribution Test:

An appropriate amount of powder was taken for ultrasonic dispersion, and the dispersion was placed into a laser particle size tester (Mastersizer 3000) for testing. For the test method, refer to the particle size distribution laser diffraction method GB/T19077-2016: 1. Test range: 0.02 μm to 2000 μm (MS2000), and 0.01 μm to 3500 μm (MS3000); 2. The limit of detection was 20 nm. Finally, a volume distribution curve of the powder was obtained. It should be noted that the average particle size in this application is a corresponding particle size when a cumulative particle size distribution percentage of a sample reaches 50% in the volume-based particle size distribution.

Capacity Retention Rate Test:

First charging and discharging was performed in a 25° C. environment, and constant-current charging was performed at a charge current of 0.5 C (that is, a current that discharges a theoretical capacity completely within 2 hours) until an upper-limit voltage was 4.8 V. Constant-current discharging was performed at a discharge current of 0.5 C until a final voltage was 3 V, and a discharge capacity was recorded at the first cycle. Charging and discharging was performed to the 100$^{th}$ cycle, and the discharge capacity of the 100$^{th}$ cycle was recorded. The capacity retention rate after the 100$^{th}$ cycle of the lithium-ion battery was calculated according to the following formula:

Capacity retention rate after the 100$^{th}$ cycle=(Discharge capacity of the 100$^{th}$ cycle/Discharge capacity of the first cycle)×100%

Pore and Crack Test:

An ion polisher (Japan Electronics-IB-09010CP) was used to process the positive electrode material to obtain a cross-section. A scanning electron microscope was used to take a picture of the cross-section at a magnification not less than 5000× to obtain a particle image. Pores and cracks on the image of the cross-section could be observed. In the cross-sectional particle image, closed zones with a different color from the surrounding zones were pores and cracks.

The pore selection requirement was as follows: In a single particle, a ratio of a longest axis of closed zones to a longest axis of the particle ranged from 2% to 10%, and a difference between the longest axis and a shortest axis of the closed zone was less than 0.5 microns. Closed zones meeting this selection requirement were pores that meet a counting requirement.

The selection requirement for cracks was as follows: In a single particle, a ratio of the longest axis of the closed zones to the longest axis of the particle was not less than 70%. Closed zones meeting this selection requirement were cracks that meet a counting requirement.

The longest and shortest axis selection method: Any two points of a closed curve were connected, a longest distance was the longest axis, and a shortest distance was the shortest axis.

The closed zone was a zone surrounded by closed lines in the graph. The line between any point inside the closed zone and any point outside the zone intersected the boundary of the zone.

Element Composition Test:

iCAP7000 ICP detector was used for performing element analysis test on the powder of positive electrode material.

For the electrode plate coated with the positive electrode material, NMP could be used for dissolving the electrode plate, a resulting solution was filtered to obtain a powder that was then dried, and iCAP7000 ICP detector was used for performing element analysis test.

X-ray diffraction test: Bruker D8 ADVANCE was used to obtain an XRD diffraction pattern of the positive electrode material. If the powder was not available, for the positive electrode plate, NMP could be used to dissolve the positive electrode plate, then a resulting solution was filtered to obtain a powder that was then dried, and XRD was used to detect the powder.

Specific surface area (BET) test method: Test equipment: BSD-BET400; Test procedure: A sample was put into a system filled with $N_2$ gas, and physical adsorption occurred on the surface of the material at the temperature of liquid nitrogen. When the physical adsorption was in equilibrium, by measuring the adsorption pressure and the flow rate of the adsorbed gas at equilibrium, a monolayer adsorption capacity of the material could be calculated, and the specific surface area of the sample could be calculated.

Compacted density test: The lithium-ion battery was discharged to 0 SOC % (SOC: State Of Charge, State of Charge), the battery was disassembled, washed, and dried, and an electronic balance was used for weighing the positive electrode plate of a specified area (both sides of the positive electrode current collector were coated with a positive electrode active substance layer), the weight was denoted as $W_1$, and a 1/10 micrometer ruler was used to measure the thickness $T_1$ of the positive electrode. A solvent was used to wash off the positive electrode active substance layer, then the positive electrode current collector was dried and weighed, denoted as $W_2$; and a 1/10 micrometer was used to measure the thickness $T_2$ of the positive electrode current collector. The weight $W_0$ and thickness $T_0$ of the positive electrode active substance layer provided on the positive electrode current collector side and the compacted density of the positive electrode active substance layer were calculated by the following formulas:

$$W_0 = (W_1 - W_2)/2$$

$$T_0 = (T_1 - T_2)/2$$

$$\text{Compacted density} = W_0/(T0 \times A).$$

TABLE 1

| Example | $Li_xNa_zCo_{1-y1}M^1_{y1}O_2$ | $Li_xNa_zCo_{1-y2}M^1_{y2}O_2$ | X | y1 | y2 | z | S1/S2 | Average size of the first particle μm | Average size of the second particle μm | Discharge capacity after the first cycle (mAh/g) | Capacity retention rate after 100 cycles |
|---|---|---|---|---|---|---|---|---|---|---|---|
| Example 1-1 | No M1 | No M2 | 0.73 | 0 | 0 | 0.02 | 0.2 | 3 | 18 | 239 | 89% |
| Example 1-2 | M1 = Al | M2 = Zn | 0.65 | 0.015 | 0.01 | 0 | 0.2 | 5 | 19 | 242 | 90% |
| Example 1-3 | | | 0.65 | 0.02 | 0.012 | 0.002 | 0.2 | 7 | 20 | 242 | 89% |
| Example 1-4 | | | 0.69 | 0.025 | 0.014 | 0.002 | 0.2 | 9 | 21 | 243 | 89% |
| Example 1-5 | | | 0.72 | 0.03 | 0.016 | 0.005 | 0.2 | 11.5 | 20 | 240 | 90% |
| Example 1-6 | | | 0.73 | 0.035 | 0.018 | 0.005 | 0.2 | 7 | 18 | 243 | 91.5% |
| Example 1-7 | | | 0.74 | 0.04 | 0.02 | 0.008 | 0.2 | 7 | 18 | 243 | 91% |
| Example 1-8 | | | 0.73 | 0.035 | 0.018 | 0.005 | 0.4 | 7 | 18 | 242 | 88% |
| Example 1-9 | | | 0.73 | 0.035 | 0.018 | 0.005 | 0.6 | 7 | 18 | 247 | 88% |
| Example 1-10 | M1 = Mg | M2 = Fe | 0.74 | 0.009 | 0.01 | 0.006 | 0.2 | 10 | 18 | 241 | 89% |
| Example 1-11 | | | 0.74 | 0.012 | 0.02 | 0.01 | 0.2 | 10.5 | 19 | 239 | 90% |
| Example 1-12 | M1 = Al | M2 = Ni | 0.74 | 0.015 + 0.002 | 0.015 + 0.002 | 0.006 | 0.2 | 11 | 20 | 243 | 89% |
| Example 1-13 | M1 = Al + Mg | | 0.74 | 0.035 + 0.001 | 0.018 + 0.001 | 0.005 | 0.2 | 11.5 | 19 | 243 | 88% |
| Example 1-14 | M1 = Al + Ti | M2 = Zn + Fe + Ni | 0.74 | 0.035 + 0.001 | 0.015 + 0.001 + 0.003 | 0.004 | 0.2 | 10 | 21 | 241 | 90% |
| Example 1-15 | | | 0.74 | 0.035 + 0.001 | 0.007 + 0.003 + 0.002 | 0.004 | 0.2 | 9.8 | 22 | 243 | 90% |
| Example 1-16 | M1 = Al + Mg + Ti | M2 = Zn + Ni + Mn | 0.74 | 0.035 + 0.001 + 0.001 | 0.003 + 0.001 + 0.001 | 0.003 | 0.2 | 10.5 | 15 | 241 | 90.9% |
| Example 1-17 | | | 0.74 | 0.035 + 0.002 + 0.001 | 0.003 + 0.002 + 0.001 | 0.003 | 0.2 | 11.5 | 17 | 241 | 89% |
| Example 1-18 | Small particles M1 = Zn | Large particles M1 = Zn | 0.74 | 0.04 | 0.04 | 0.008 | 0.2 | 3 | 15 | 240 | 89 |
| Example 1-19 | Small particles M1 = Al | Large particles M1 = Al | 0.74 | 0.04 | 0.04 | 0.008 | 0.2 | 5 | 17 | 239 | 89 |
| Comparative Example 1-1 | M1 = Al | Non | 0.65 | 0.035 | Non | 0.002 | Non | 7 | Non | 237 | 88% |
| Comparative Example 1-2 | M1 = Al + Mg | Non | 0.8 | 0.015 + 0.002 + | Non | 0.006 | Non | 7 | Non | 239 | 89% |
| Comparative Example 1-3 | M1 = Al + Ti | Non | 0.74 | 0.035 + 0.001 | Non | 0.006 | Non | 7 | Non | 239 | 88% |
| Comparative Example 1-4 | M1 = Al + Mg + Ti | Non | 0.74 | 0.035 + 0.001 + 0.001 | Non | 0.003 | Non | 7 | Non | 239.5 | 81% |
| Comparative Example 1-5 | Non | M2 = Zn | 0.65 | Non | 0.018 | 0.002 | Non | Non | 18 | 225 | 82% |
| Comparative Example 1-6 | Non | M2 = Fe | 0.8 | Non | 0.02 | 0.006 | Non | Non | 18 | 230 | 78% |
| Comparative Example 1-7 | Non | M2 = Zn + Fe + Ni | 0.74 | Non | 0.015 + 0.001 + 0.003 | 0.006 | Non | Non | 18 | 232 | 78% |
| Comparative Example 1-8 | Non | M2 = Zn + Ni + Mn | 0.74 | Non | 0.003 + 0.001 + 0.001 | 0.003 | Non | Non | 18 | 235 | 77% |
| Comparative Example 1-9 | M1 = Al | M2 = Zn | 0.73 | 0.035 | 0.018 | 0.005 | 0.2 | 13 | 32 | 232 | 68% |

TABLE 1-continued

| Example | $Li_xNa_zCo_{1-y1}M^1_{y1}O_2$ | $Li_xNa_zCo_{1-y2}M^1_{y2}O_2$ | X | y1 | y2 | z | S1/S2 | Average size of the first particle μm | Average size of the second particle μm | Discharge capacity after the first cycle (mAh/g) | Capacity retention rate after 100 cycles |
|---|---|---|---|---|---|---|---|---|---|---|---|
| Comparative Example 1-10 | | | 0.73 | 0.035 | 0.018 | 0.005 | 0.2 | 15 | 35 | 235 | 77% |

It could be learned from Table 1 that overall performance of the discharge capacity after the first cycle and cycling capacity in Example 1-1 to Example 1-17 were better than that in Comparative Example 1-1 to Comparative Example 1-8, which shown that, under the condition that the positive electrode material comprised both $Li_{a1}Na_{c1}Co_{1-b1}M^1_{b1}O_2$ and $Li_{a2}Na_{c2}Co_{1-b2}M^2_{b2}O_2$ with the $P6_3mc$ crystal phase structure, and particles of $Li_{a1}Na_{c1}Co_{1-b1}M^1_{b1}O_2$ and $Li_{a2}Na_{c2}Co_{1-b2}M^2_{b2}O_2$ had different sizes, the discharge capacity after the first cycle and cycling capacity could be improved. Therefore, in some examples of this application, it is specified that the positive electrode material comprised particles with $P6_3mc$ crystal phase structure, and the particle size distribution frequency graph of the positive electrode material comprised the first peak and the second peak.

It could be learned from Example 1-18 to Example 1-19 that Zn was used for doping in Example 1-18, Al was used for doping in Example 1-19, and because there are both large particles and small particles having the same chemical compositions, both the discharge capacity after the first cycle and the capacity retention rate after 100 cycles in Example 1-18 and Example 1-19 were better than those in Example 1-1. Therefore, the particle size distribution frequency graph of the positive electrode material in some examples of this application comprised the first peak and the second peak.

In Examples and Comparative Examples shown in Table 2, the positive electrode materials used were all $Li_xNa_zCo_{1-y}M_yO_2$, and the crystal phase structures of the positive electrode materials in Examples and Comparative Examples in Table 2 were all $P6_3mc$.

TABLE 2

| Example | $Li_xNa_zCo_{1-y1}M^1_{y1}O_2$ | $Li_xNa_zCo_{1-y2}M^2_{y2}O_2$ | Pores | Cracks | Discharge capacity after the first cycle (mAh/g) | Capacity retention rate after 100 cycles |
|---|---|---|---|---|---|---|
| Example 2-1 | $Li_{0.73}Na_{0.005}Co_{0.965}Al_{0.035}O_2$ | $Li_{0.73}Na_{0.005}Co_{0.982}Zn_{0.018}O_2$ | With | With | 243 | 92% |
| Comparative Example 2-1 | | | With | Without | 236 | 90% |
| Comparative Example 2-2 | | | Without | With | 240 | 90% |
| Comparative Example 2-3 | | | Without | Without | 231 | 87% |

By comparing Example 1-1 to Example 1-17, and Comparative Example 1-9 and Comparative Example 1-10, it could be learned that under the condition that the first average particle size was within 3 μm to 12 μm and the second average particle size was within 15 μm to 30 μm, the first-cycle discharge capacity of the lithium-ion battery was not less than 239 mAh/g and the capacity retention rate after 100 cycles was not lower than 88%; and under the condition that the first average particle size was greater than or equal to 13 μm and the second average particle size was greater than or equal to 32 μm, the discharge capacity after the first cycle and the retention rate of the cycling capacity were decreased. Therefore, in some examples, it is specified that an average particle size of the first particles ranged from 3 μm to 12 μm and an average particle size of the second particles ranges from 15 μm to 30 μm.

By comparing Example 1-1 to Example 1-17, it could be learned that excluding Example 1-1, $M^1$ or $M^2$ was used for doping in Example 1-2 to Example 1-17, and the first-cycle discharge capacities and the capacity retention rates after 100 cycles in Example 1-2 to Example 1-17 were better than those in Example 1-1. Therefore, in some examples of this application, the positive electrode material had $M^1$ or $M^2$.

By comparing Example 2-1 and Comparative Example 2-1 to Comparative Example 2-3, it could be learned that, compared with Comparative Example 2-3 in which the positive electrode material had no pores and cracks, under the condition that the positive electrode material had pores or cracks, the discharge capacity after the first cycle and the capacity retention rate after 100 cycles could be improved; and under the condition that the positive electrode material had both pores and cracks, the lithium-ion battery had a higher discharge capacity after the first cycle and a higher capacity retention rate after 100 cycles. Therefore, in some examples of this application, it is specified that the particles of the positive electrode material had pores and cracks inside.

In Examples and Comparative Examples shown in Table 3, the positive electrode materials used were all $Li_xNa_zCo_{1-y}M_yO_2$, and the crystal phase structures of the positive electrode materials in Examples and Comparative Examples in Table 3 were all $P6_3mc$.

TABLE 3

| Example | $Li_xNa_zCo_{1-y1}M^1_{y1}O_2$ | $Li_xNa_zCo_{1-y2}M^2_{y2}O_2$ | Specific surface area (m2/g) | Discharge capacity after the first cycle (mAh/g) | Capacity retention rate after 100 cycles |
|---|---|---|---|---|---|
| Example 3-1 | $Li_{0.73}Na_{0.005}Co_{0.965}Al_{0.035}O_2$ | $Li_{0.73}Na_{0.005}Co_{0.982}Zn_{0.018}O_2$ | 0.66 | 243 | 92.5% |
| Example 3-2 | | | 0.76 | 242 | 92.00% |
| Example 3-3 | | | 2 | 240 | 90% |
| Comparative Example 3-1 | | | 3 | 231 | 77% |
| Comparative Example 3-2 | | | 2.5 | 235 | 78% |

By comparing Example 3-1, Example 3-2, Comparative Example 3-1, and Comparative Example 3-2, it could be learned that under the condition that the specific surface area of the positive electrode material was greater than 2 $m^2/g$, the discharge capacity after the first cycle of the lithium-ion battery was small, and the capacity retention rate after 100 cycles was low; and under the condition that the specific surface area of the positive electrode material was less than or equal to 2 $m^2/g$, the discharge capacity after the first cycle of the lithium-ion battery was higher, and the capacity retention rate after 100 cycles was better. Therefore, in some examples of this application, it is specified that the specific surface area of the positive electrode material was 0.1 $m^2/g$ to 2 $m^2/g$.

In Examples and Comparative Examples shown in Table 4, the positive electrode materials used were all $Li_xNa_zCo_{1-y}M_yO_2$, and the crystal phase structures of the positive electrode materials in Examples and Comparative Examples in Table 4 were all $P6_3mc$. A main peak range in Table 4 refers to a diffraction angle of the strongest diffraction peak in the X-ray diffraction pattern of the positive electrode material, and a full-width at half maximum in Table 4 refers to a diffraction peak of the main peak.

TABLE 4

| Example | $Li_xNa_zCo_{1-y1}M^1_{y1}O_2$ | $Li_xNa_zCo_{1-y2}M^2_{y2}O_2$ | Main peak range/degree | Full-width at half maximum/degree | Discharge capacity after the first cycle (mAh/g) | Capacity retention rate after 100 cycles |
|---|---|---|---|---|---|---|
| Example 4-1 | $Li_{0.73}Na_{0.005}Co_{0.965}Al_{0.035}O_2$ | $Li_{0.73}Na_{0.005}Co_{0.982}Zn_{0.018}O_2$ | 18.5 | 0.2 | 243 | 93.0% |
| Example 4-2 | | | 18.7 | 0.32 | 242 | 92.00% |
| Comparative Example 4-1 | | | 18.5 | 0.9 | 231 | 74% |
| Comparative Example 4-2 | | | 18.5 | 1.2 | 235 | 76% |

By comparing Example 4-1, Example 4-2, Comparative Example 4-1, and Comparative Example 4-2, it could be learned that under the condition that the main peak range was 18° to 19°, compared to a case that the full-width at half maximum was greater than 0.5°, and under the condition that the full-width at half-maximum was in a range of 0° to 0.5°, the discharge capacity after the first cycle and the capacity retention rate after 100 cycles of the lithium-ion battery were both high; and in the X-ray diffraction pattern of the positive electrode material, diffraction angles of the strongest diffraction peaks were in the range of 18° to 19°, and the full-width at half maximums of the strongest diffraction peaks were in the range of 0° to 0.5°.

In Examples and Comparative Examples shown in Table 5, the positive electrode materials used were all $Li_xNa_zCo_{1-y}M_yO_2$, and the crystal phase structures of the positive electrode materials in Examples and Comparative Examples in Table 5 were all $P6_3mc$.

TABLE 5

| Example | $Li_xNa_zCo_{1-y1}M^1_{y1}O_2$ | $Li_xNa_zCo_{1-y2}M^2_{y2}O_2$ | Compacted density of the positive electrode active substance layer (g/cm³) | Discharge capacity after the first cycle (mAh/g) | Capacity retention rate after 100 cycles |
|---|---|---|---|---|---|
| Example 5-1 | $Li_{0.73}Na_{0.005}Co_{0.965}Al_{0.035}O_2$ | $Li_{0.73}Na_{0.005}Co_{0.982}Zn_{0.018}O_2$ | 3.3 | 236 | 89% |
| Example 5-2 | | | 3.6 | 237 | 91% |
| Example 5-3 | | | 3.9 | 240 | 90% |
| Example 5-4 | | | 4.15 | 242 | 91% |
| Example 5-5 | | | 4.3 | 239 | 91% |
| Example 5-6 | | | 4.35 | 235 | 90% |
| Comparative Example 5-1 | | | 4.4 | 228 | 78% |
| Comparative Example 5-2 | | | 4.5 | 226 | 72% |

By comparing Example 5-1 to Example 5-6, Comparative Example 5-1, and Comparative Example 5-2, it could be learned that the first-cycle discharge capacities and capacity retention rates after 100 cycles in Example 5-1 to Example 5-6 were higher than those in Comparative Example 5-1 and Comparative Example 5-2, which shows that under the condition that the compacted density of the positive electrode active substance layer ranges from 3 g/cm³ to 4.35 g/cm³, it is beneficial to improve the discharge performance and cycling performance of the lithium-ion battery.

TABLE 6

| Example | $Li_xNa_zCo_{1-y1}M^1_{y1}O_2$ | $Li_xNa_zCo_{1-y2}M^2_{y2}O_2$ | Additive | Content of additive (wt. %) | Discharge capacity after the first cycle (mAh/g) | Capacity retention rate after 100 cycles |
|---|---|---|---|---|---|---|
| Example 7-1 | $Li_{0.73}Na_{0.005}Co_{0.965}Al_{0.035}O_2$ | $Li_{0.73}Na_{0.005}Co_{0.982}Zn_{0.018}O_2$ | 1,3,6-hexanetricarbonitrile | 0.3 | 240 | 89% |
| Example 7-2 | | | Adiponitrile | 0.3 | 242 | 91% |
| Example 7-3 | | | 1,3,6-hexanetricarbonitrile and adiponitrile | 0.3 | 243 | 90% |
| Example 7-4 | | | Adiponitrile | 0.1 | 245 | 91% |
| Example 7-5 | | | Adiponitrile | 0.2 | 243 | 91% |
| Example 7-6 | | | Adiponitrile | 15 | 243 | 90% |
| Comparative Example 7-1 | | | Adiponitrile | 16 | 220 | 80% |
| Comparative Example 7-2 | | | Non | 0 | 239 | 87% |

By comparing Example 7-1 to Example 7-6, Comparative Example 7-1, and Comparative Example 7-2, it could be learned that under the condition that a compound having two or three cyano groups was added to the electrolyte of the lithium-ion battery and the mass percentage of the compound having two to three cyano groups was controlled in the range of 0.01 wt % to 15 wt %, the discharge capacity after the first cycle and the capacity retention rate after 100 cycles of the lithium-ion battery could be improved.

The above descriptions are only preferred embodiments of this application and explanations of the applied technical principles. Those skilled in the art should understand that the scope of disclosure involved in this application is not limited to the technical solutions formed by the specific combination of the above technical features, and should also cover other technical solutions formed by any combination of the above technical features or their equivalent features. For example, the technical solution formed by replacement between the above features and the technical features having similar functions disclosed in this application.

The invention claimed is:

1. A positive electrode material, comprising:

particles with $P6_3mc$ crystal phase structure;

wherein, a particle size distribution frequency graph of the positive electrode material comprises a first peak and a second peak, the positive electrode material comprising first particles and second particles, wherein the first particles comprise $Li_xNa_zCo_{1-y1}M^1_{y1}O_2$, wherein $M^1$ comprises at least one of Al, Mg, Ti, Zr, La, Ca, Ge, Nb, Sn, or Y, and have an average particle size of from 3 μm to 12 μm; and the second particles comprise $Li_xNa_zCo_{1-y2}M^2_{y2}O_2$, wherein $M^2$ comprises at least one of Ni, Mn, Zn, or Fe, and have an average particle size of from 15 μm to 30 μm:

wherein $0.6<x<0.95$, $0\le y1<0.15$, $0\le z<0.05$, and $0\le y2<0.15$, the first particles are particles represented by the first peak, the second particles are particles represented by the second peak, both the first particles and the second particles have a $P6_3mc$ crystal phase structure.

2. The positive electrode material according to claim 1, wherein a peak area of the first peak is S1, a peak area of the second peak is S2, and $0<S1/S2<1$.

3. The positive electrode material according to claim 1, wherein the particles of the positive electrode material have pores and cracks; and a specific surface area of the positive electrode material ranges from 0.1 m²/g to 2 m²/g.

4. An electrochemical apparatus, wherein the electrochemical apparatus comprises:

a positive electrode;

a negative electrode;

an electrolyte; and a separator disposed between the positive electrode and the negative electrode;

wherein the positive electrode comprises a current collector and a positive electrode active substance layer disposed on the current collector, and the positive electrode active substance layer comprises a positive electrode material, the positive electrode material comprises particles with $P6_3mc$ crystal phase structure; and a particle size distribution frequency graph of the positive electrode material comprises a first peak and a second peak, wherein the particle size of particles represented by the first peak are smaller than the particle size of particles represented by the second peak, a peak area of the first peak is S1, a peak area of the second peak is S2, and $0<S1/S2<1$, the positive electrode material comprising first particles and second particles, wherein the first particles comprise $Li_xNa_zCo_{1-y1}M^1_{y1}O_2$, wherein $M^1$ comprises at least one of Al, Mg, Ti, Zr, La, Ca, Ge, Nb, Sn, or Y, and have an average particle size of from 3 μm to 12 μm; and the second particles comprise $Li_xNa_zCo_{1-y2}M^2_{y2}O_2$, wherein $M^2$ comprises at least one of Ni, Mn, Zn, or Fe, and have an average particle size of from 15 μm to 30 μm;

wherein $0.6<x<0.95$, $0 \leq y1<0.15$, $0 \leq z<0.05$, and $0 \leq y2<0.15$, the first particles are particles represented by the first peak, the second particles are particles represented by the second peak, both the first particles and the second particles have a $P6_3mc$ crystal phase structure.

5. The electrochemical apparatus according to claim 4, wherein the positive electrode active substance layer comprises the positive electrode material, the particles of the positive electrode material have pores and cracks; and a specific surface area of the positive electrode material ranges from 0.1 $m^2/g$ to 2 $m^2/g$.

6. The electrochemical apparatus according to claim 4, wherein a compacted density of the positive electrode active substance layer ranges from 3 $g/cm^3$ to 4.35 $g/cm^3$.

7. The electrochemical apparatus according to claim 4, wherein the electrolyte comprises a compound having two or three cyano groups, wherein a percentage of the compound having two or three cyano groups ranges from 0.01 wt % to 15 wt % based on a weight of the electrolyte; and the compound having two or three cyano groups comprises at least one of a dinitrile compound, a trinitrile compound, an ether dinitrile compound, or an ether trinitrile compound.

8. The electrochemical apparatus according to claim 7, wherein the compound having two or three cyano groups comprises at least one of glutaronitrile, succinonitrile, adiponitrile, 1,3,6-hexanetricarbonitrile, 1,3,5-pentanetricarbonitrile, 1,2,3-propanetricarbonitrile, or 1,2,3-tris (2-cyanoethoxy)butane.

* * * * *